US008589133B1

(12) United States Patent
Dalessandro et al.

(10) Patent No.: US 8,589,133 B1
(45) Date of Patent: Nov. 19, 2013

(54) DYNAMIC SIMULATION OF A SYSTEM OF INTERDEPENDENT SYSTEMS

(75) Inventors: Donald D. Dalessandro, Williamstown, NJ (US); Donald R. Longo, Pittsgrove, NJ (US); Kevin J. Brown, Waldwick, NJ (US); Michael G. Zink, Marlton, NJ (US); Frank T. Ferrese, Haddon Heights, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 929 days.

(21) Appl. No.: 12/462,059

(22) Filed: Jul. 17, 2009

(51) Int. Cl.

| | |
|---|---|
| ***G06G 7/48*** | (2006.01) |
| ***G06G 7/50*** | (2006.01) |
| ***G06F 17/50*** | (2006.01) |
| ***B60L 3/00*** | (2006.01) |
| ***G06Q 10/00*** | (2012.01) |

(52) U.S. Cl.
USPC .............. 703/8; 703/1; 703/7; 703/9; 701/21; 705/7.11

(58) Field of Classification Search
USPC .................. 703/13, 21, 8; 717/125, 134–135; 700/300, 306; 701/21
See application file for complete search history.

(56) References Cited

U.S. PATENT DOCUMENTS

| | | | | | |
|---|---|---|---|---|---|
| 4,980,824 | A | * | 12/1990 | Tulpule et al. | 718/106 |
| 5,053,969 | A | * | 10/1991 | Booth | 701/11 |
| 5,474,454 | A | * | 12/1995 | Knapp et al. | 434/29 |
| 5,713,037 | A | * | 1/1998 | Wilkinson et al. | 702/33 |
| 5,870,588 | A | * | 2/1999 | Rompaey et al. | 703/13 |
| 6,058,492 | A | * | 5/2000 | Sample et al. | 714/33 |
| 6,230,114 | B1 | * | 5/2001 | Hellestrand et al. | 703/13 |
| 6,389,529 | B1 | * | 5/2002 | Arimilli et al. | 712/225 |
| 6,718,294 | B1 | * | 4/2004 | Bortfeld | 703/20 |
| 6,945,780 | B2 | * | 9/2005 | Perry | 434/11 |
| H2195 | H | * | 7/2007 | Sisemore | 703/1 |
| 7,467,051 | B2 | * | 12/2008 | Skjetne et al. | 702/64 |
| 7,496,434 | B2 | * | 2/2009 | Fossen et al. | 701/21 |
| 7,716,031 | B2 | * | 5/2010 | Vanspauwen et al. | 703/13 |
| 7,756,689 | B1 | * | 7/2010 | Lin et al. | 703/8 |
| 8,229,776 | B1 | | 7/2012 | Woodward et al. | |
| 8,489,373 | B2 | * | 7/2013 | Calmels | 703/8 |

(Continued)

OTHER PUBLICATIONS

"Simulating System of Systems"; Kevin brown et al.; (pp. 1-7), Aug. 12, 2009 Electric Machines Technology Symposium 2008 (EMTS 2008).*

(Continued)

*Primary Examiner* — Akash Saxena
(74) *Attorney, Agent, or Firm* — Howard Kaiser

(57) ABSTRACT

Interdependencies between pairs/groups of individual systems are evaluated in determining the composition of a universal system of interdependent systems. Data tables reflecting the interdependencies are contained in a central database resident in a server's memory. Plural/multiple computers are connected to the server, each computer having running thereon at least one simulation program, each simulation program being associated with at least one individual system and being characterized by individual time steps. In each individual time step, the simulation program updates (reads data from and writes data to) the central database, and displays updated information. In each universal time step (characterizing the simulation of the universal system), all simulation programs are temporally coordinated so that each simulation program's individual time step takes place once; no universal time step is perfected until every individual time step has completed its updating of pertinent data in the central database.

16 Claims, 13 Drawing Sheets

(56) References Cited

U.S. PATENT DOCUMENTS

| | | | | |
|---|---|---|---|---|
| 2002/0052725 | A1* | 5/2002 | Wasynczuk et al. | 703/22 |
| 2002/0069039 | A1* | 6/2002 | Ricks et al. | 703/1 |
| 2002/0138571 | A1* | 9/2002 | Trinon et al. | 709/204 |
| 2004/0010398 | A1* | 1/2004 | Noma et al. | 703/1 |
| 2005/0012485 | A1* | 1/2005 | Dundon | 318/568.11 |
| 2005/0278275 | A1* | 12/2005 | Myers et al. | 707/1 |
| 2006/0064211 | A1* | 3/2006 | Johansen et al. | 701/21 |
| 2006/0258462 | A1* | 11/2006 | Cheng et al. | 463/42 |
| 2008/0126058 | A1* | 5/2008 | Jain et al. | 703/13 |
| 2008/0177511 | A1* | 7/2008 | Kamatsuchi | 703/1 |
| 2008/0300834 | A1* | 12/2008 | Wiemer et al. | 703/2 |
| 2010/0030525 | A1* | 2/2010 | Dong et al. | 703/1 |
| 2010/0063786 | A1* | 3/2010 | Harke | 703/6 |
| 2012/0023314 | A1* | 1/2012 | Crum et al. | 712/214 |
| 2012/0259489 | A1* | 10/2012 | Hamamatsu et al. | 701/21 |
| 2013/0103364 | A1* | 4/2013 | Kawakita et al. | 703/1 |

OTHER PUBLICATIONS

"System of Systems Simulation"; Citation in International Simulation Multi-Conference by Brown et al. (pp. 1-40) citation on p. 9 of 40; Jun. 16-19, 2008; SISO/SCS conference.*

Slideshow presentation (12 pages) by Michael G. Zink at EMTS 2008 on Aug. 12, 2008, of the following paper: Kevin J. Brown, Donald D. Dalessandro, Donald R. Longo, and Michael G. Zink, "Simulating Systems of Systems," Electric Machines Technology Symposium 2008 (EMTS 2008), The American Society of Naval Engineers (ASNE), Philadelphia, Pennsylvania, Aug. 12-13, 2008.

U.S. Appl. No. 13/021,580, filed Feb. 4, 2011, Donald R. Longo, Donald D. Dalessandro, Quing Dong, Frank T. Ferrese, John Roach, and Michael G. Zink, "Thermal Management Smart Valve with Rupture Detection and Isolation" (copending).

* cited by examiner

FLUID SIM
CHILLED WATER
FIRE MAIN
...
POWER SIM
HV/LV CONNECTIVITY
...
COMMUNICATION SIM
ECS CONNECTIVITY
...
SMART VALVE MODEL
FIRE SIM
SMOKE SIM
100,150
FLUID FLOW
COMPONENT FAILURES
COMPONENT FAILURES
VALVE CONTROL
FIRE SPREAD
SMOKE SPREAD
SLQ SERVER
200
201,202
V-0001
SYSTEM STATUS
FINAL STATE
FINAL STATE
103
HM1
DEACT
3D MODEL

| PUMP | | | | | | | | |
|---|---|---|---|---|---|---|---|---|
| NAME | COMMAND_ON | STATE_ON | SPEED | FLOW | POWER_FAIL | COMMUNICATION_FAIL | DAMAGE | ACTIVE_LOAD |
| (TEXT) | (INT) | (INT) | (FLOAT) | (FLOAT) | (INT) | (INT) | (INT) | (FLOAT) |
| PUMP 1 | 1 | 1 | 188 | 106 | 0 | 0 | 0 | 215 |
| PUMP 2 | 1 | 0 | 0 | 0 | 1 | 1 | 0 | 0 |
| PUMP 3 | 0 | 0 | 0 | 0 | 0 | 0 | 0 | 0 |
| PUMP 4 | 1 | 1 | 153 | 93 | 0 | 0 | 0 | 200 |

| VALVES | | | | | | |
|---|---|---|---|---|---|---|
| NAME | COMMAND_OPEN | OPEN | FLOW | POWER_FAIL | COM_FAIL | DAMAGE |
| (TEXT) | (INT) | (FLOAT) | (FLOAT) | (FLOAT) | (FLOAT) | (INT) |
| V-0001 | 0 | 0 | 0 | 0 | 0 | 0 |
| V-0022 | 1 | 1 | 500 | 0 | 0 | 0 |
| V-0043 | 1 | 1 | 506 | 0 | 0 | 0 |
| V-0104 | 1 | 1 | 488 | 0 | 0 | 0 |
| V-0125 | 1 | 0.2 | 123 | 1 | 0 | 0 |

DYNAMIC SIMULATION OF A SYSTEM OF INTERDEPENDENT SYSTEMS

BACKGROUND OF THE INVENTION

Computer simulation is a conventional tool for designing a new system. System simulation has been used for such purposes as improving systems, reducing risk, and reducing system design costs. Fluid systems, power systems, and communication systems are but a few examples of the many types of systems that have been modeled.

There are a variety of systems and a variety of models. Conventional design of a model is solely concerned with the successful running of a system under a certain set of conditions. Many good software packages are commercially available to simulate specific systems in this manner. Different systems lend themselves to different types of models. Among the types of models that are conventionally used to simulate systems are rule-based models, physics-based models, and hardware-in-the-loop models. Nevertheless, if a system designer wishes to ascertain how a system will respond to a system-degrading event, conventional modeling may not suffice.

A system can be dependent on another system. As an example, simulation of systems prone to damaging events may require modeling of such events as fire spread, smoke spread, and flooding. A simulative strategy involving the separate simulation of each of these different systems erroneously assumes that each system is ideal. For instance, if a pump in a fluid system relies on the power provided by a power system, then there may be conditions (e.g., power failure) that are not accounted for when simulating the fluid system alone. Furthermore, system-impactive events that occur in-between systems may not be accounted for when simulating systems individually. These kinds of interdependencies between systems suggest the need for simulation of a "system of systems."

The consideration of interactions between interdependent systems is important to understanding how failures in one system propagate into other systems, and how these failures affect the operation of the system of systems. In conventional simulation involving design of a single system that is a member of a system of systems, the interdependence between the systems is not considered beyond the interfaces between the systems. A system's "recoverability"—i.e., the ability to restore the system to a working state after an interruption—often represents a critical aspect of system design. For purposes of performing recoverability analysis of a system, conventional simulative approaches may not be truly indicative of real-world consequences.

It is considerably more challenging to simulate a system that is composed of multiple systems than it is to simulate a single system. The need exists for a methodology for simulating a system of interdependent systems so as to accurately and insightfully account for interdependencies between the systems.

SUMMARY OF THE INVENTION

In view of the foregoing, an object of the present invention is to provide a method for simulating a system of interdependent systems. Further objects of the present invention are to provide a computer-inclusive apparatus for performing same, and to provide a computer program product for performing same.

The present invention as typically embodied represents a methodology according to which plural/multiple systems are simulated in an interactive environment using a centralized database. The present invention's simulation of a system of systems can be very useful. Generally speaking, systems are dependent on other systems. When designing a particular system, other systems need to be considered. The present invention simulates plural/multiple systems simultaneously in an interactive environment, thereby considering plural/multiple systems in a highly effective manner.

According to typical practice of the present invention, separate software packages run simulations (e.g., rule-based, or physics-based, or hardware-in-the-loop) over a network of client computers and a server (host). Each individual simulator (model/simulation program) reads information that is contained in a central database, and writes information to the central database. The central database is common to all individual system models that are included in the present invention's universal system-of-systems model. The present invention adjusts for inconsistencies in universal time steps by pausing each individual simulator that has fully iterated, and waiting for slower simulators to iterate, continually doing so until a steady state is reached for that particular universal time step. Any simulator that requires more time to process its information for a current universal time step is permitted to finish its iteration before any other simulator is permitted to move on to its next iteration.

As typically embodied, the present invention's method for dynamically simulating a system of systems comprises: (a) determining individual systems constituting a universal system of the individual systems; (b) associating a simulative computer program with each individual system; (c) establishing a central database; (d) iteratively updating the data tables in the central database; and, (e) iteratively displaying information pertaining to the data tables. The determining of the individual systems includes identifying dependencies between the individual systems. The establishing of the central database includes constructing data tables indicative of the dependencies between the individual systems. The data tables are contained in the central database and are accessible by each simulative computer program.

Each single iteration of updating (sometimes referred to herein as a "single-iteration update") of the data tables corresponds to a single time step, and includes maintaining every simulative computer program in the same time step. A single-iteration update of the data tables is "perfected"—and hence the time step in which the single-iteration update is taking place is concluded—upon the completion by every simulative computer program of its reading of the data tables and its writing of its new data. Each simulative computer program writes data to at least one of the data tables. In any given time step, each simulative computer program, at its own pace, reads all of the pertinent (one or more) data tables, displays information indicative of at least one of the data tables, and writes new data to all of the pertinent (one or more) data tables. Each display of information in a given time step corresponds to the single-iteration update as perfected at the conclusion of the previous time step. Each display of information includes at least one display by at least one simulative computer program.

In effect, all of the data tables are erased, and the data entry process begins anew, at the beginning of every time step. In other words, the entire set of new data that is written by the simulative computer programs to the data tables in each time step replaces the entire set of data written to the data tables in the previous time step. In the context of inventive practice, the terms "new data" and "replacement data" and "newly replaced data" are used synonymously herein, and the terms "old data" and "previous data" are used synonymously herein. New data (replacement data) is any data written by a simulative computer program to replace old data (previous data) in any data table that is contained in the central database.

As the present invention is typically embodied, in each time step new data is completely written by each simulative computer program regardless of whether the new data is the same as the corresponding old data or differs from the corresponding old data. New data can repeat old data, or can effect one or more changes to old data, e.g., via addition of data, and/or deletion of data, and/or modification of data. In each time step, every simulative computer program product starts anew and proceeds to write all of its data in updated form to one or more data tables, regardless of whether any of its new data changes anything with respect to any of the data tables.

In accordance with typical inventive practice, a dependency between individual systems can be either a "direct dependency" or an "indirect dependency." A direct dependency exists between individual systems when an event occurring in at least a first individual system has a causal connection to an event occurring in at least a second individual system. An indirect dependency exists between individual systems when an event occurring in-between at least two individual systems has a causal connection to an event occurring in at least one of the at least two individual systems.

Generally speaking, system-of-systems simulation is considerably more problematical than systems simulation, as the former requires solutions to problems attendant efforts to judiciously combine disparate systems into an overarching system of systems. For instance, the sharing of information between systems is problematical in system-of-systems simulation. The present invention's system-of-systems simulation methodology uniquely succeeds in bringing individual systems together into a system of systems so that all of the systems are "on the same page," so to speak.

The present invention's comprehensive system-of-systems simulation methodology has unique features including the following: aggregation of system-of-systems information reflecting dependencies between individual systems of a universal system of the individual systems; containment by a central database of all system-of-systems information so as to be accessible by the individual system simulator programs; temporal coordination of individual system simulator programs running on different timing intervals.

The present invention maintains all of the individual system simulator programs at equal time steps through its provision that the updating of system-of-systems information in any given time step is not "perfected" until every individual system simulator program, at its own pace (i.e., in its own timing interval), has finished reading all current system-of-systems information and has written new information replacing the current system-of-systems information. Each timing interval corresponding to the entire inventive system-of-systems simulation is sometimes referred to herein as a "universal" time step. In contrast, each individual system simulation has its own timing interval, sometimes referred to herein as an "individual" time step. Individual time steps of different individual system simulator programs tend to differ in duration. A key feature of the present invention is the synchronization of all of the individual time steps so that they "match up" in sequentially equivalent universal time steps.

The present invention is uniquely capable of simulating a complete system of systems in order to perform simultaneous evaluation of integrated systems. As typically embodied, the present invention individually simulates multiple integrated systems in a contemporaneous manner so as to collectively and accurately simulate a complete technology. Multiple computer displays can be employed to facilitate inventive analysis. Typical inventive embodiments see effects on a complete design, and design changes can be recommended to individual systems based on system-of-system responses. The present invention as typically embodied allows for changes to be made quickly and inexpensively. In contrast, according to a conventional approach, system simulations are run separately and uncooperatively, and problems in the complete technology are searched for by manual inspection. Inventive practice can be compatible with distribution processing requirements in a multi-computing environment so that computing power can be spread over multiple computers. The present invention's interactive system-of-systems approach to performing recoverability analysis of a system will tend to be truer to reality than will a conventional approach.

Commercially available software packages simulate specific kinds of systems (fluid, electrical, structural, etc.) well, but are not designed to include other kinds of systems, or to encompass every kind of system that will be used to develop a new mission capability, or to take into consideration effects of components external to the particular system being analyzed (such as the physical layout of the system). The present invention can interlink current software packages and current hardware models so as to optimize systems and design solutions to new mission capabilities. The present invention can assimilate multiple models into an environment where each model can interact with each other, thereby producing a more accurate simulation of a system of systems. The models may reside in different software packages and may run in different timing intervals.

The present invention succeeds in displaying, in an efficient manner, information that is being generated by an inventive simulation. The present invention's solution involves one centralized database where all the information is shared by individual models that are able to write the information generated and read the required information from the other models at each time step. The centralized database is the key to organizing the information so that, as the models change and new models are added, these changes are able to be accommodated in a seamless fashion.

The present invention's establishment of its unique interactive environment, in which a server is used to contain a central database for informational access by individual systems of a universal system of systems, can permit and promote, inter alia: intelligent passing of information; interaction between different types of models in the same timing sequencing; display of information as the information changes with each time step; expandability of inventive system-of-systems simulation so that newly completed system models can be added to the inventive system-of-systems simulation without breaking or compromising previously included system models; a plug-and-play environment in which different simulators can be run independently of each other, and only interact when required; independent development of models that are permitted to interact; simultaneous simulation of different types of models and different systems, including but not limited to hardware-in-the-loop; plural/multiple displays for showing current information during a simulation; recordation of the entire database at each time step for playback, without having to run any of the simulation software again.

Incorporated herein by reference is the following paper disclosing various aspects of the present invention: Kevin J. Brown, Donald D. Dalessandro, Donald R. Longo, and Michael G. Zink, "Simulating Systems of Systems," Electric Machines Technology Symposium 2008 (EMTS 2008), The American Society of Naval Engineers (ASNE), Philadelphia, Pa., 12-13 Aug. 2008, presented on 12 Aug. 2008.

BRIEF DESCRIPTION OF THE DRAWINGS

The present invention will now be described, by way of example, with reference to the accompanying drawings, wherein:

FIG. 6 and FIG. 7 are each an example of a data table in an SQL central database.

FIG. 10 illustrates dependencies that may exist between and in-between systems, and that may affect systems.

DESCRIPTION OF EXEMPLARY EMBODIMENTS OF THE INVENTION

Three notable types of conventional models are a rule-based model, a physics-based model, and a hardware-in-the-loop model. These and other types of models (simulations) can be implemented to represent individual systems in inventive practice of dynamic system-of-systems simulation. Although the terms "model" and "simulation" have occasionally been distinguished from each other in technical usage, these terms are used interchangeably herein to broadly refer to representation of a thing, such as representation of characteristics or behaviors of a physical, chemical, mechanical, or electromechanical system.

Figure 1:
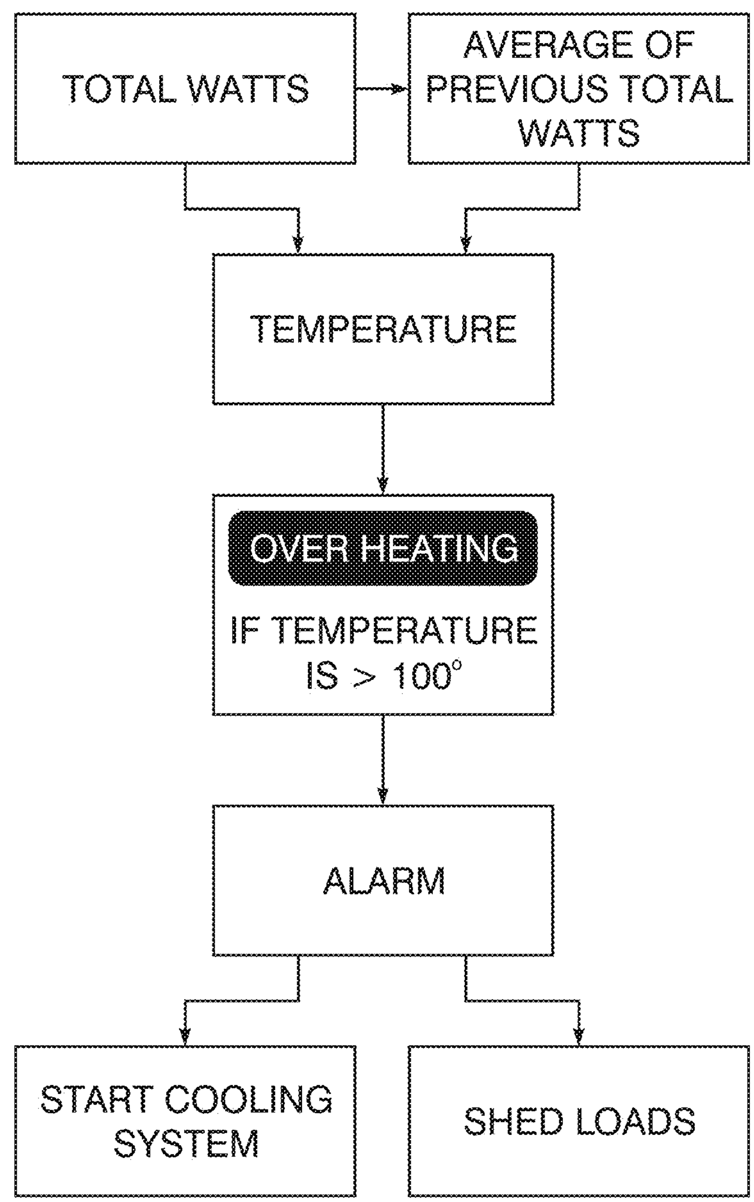
FIG. 1 is an example of a (partial) schematic of a rule-based model.

With reference to FIG. 1, a rule-based model provides for a set of rules that dictate what happens under a certain set of conditions. A rule-based model can work well for systems that would be too math-intensive to use a physics-based model, or too expensive to physically set up hardware. A rule-based model can also be effective for modeling occurrences in-between systems. Nevertheless, a rule-based model can quickly become very complicated if trying to account for every possible scenario, and may not be the best way to model extremely complex systems.

A mathematical physics-based model uses equations to model behavior of different devices and actual physical properties. The values of the properties for each of the devices can then be calculated at each time step. An example of this would be using the well known physical equation for dynamic pressure. This equation could be used to solve the pressure at a given point in a fluid model, based on the fluid density and the current velocity of the fluid. There are many software packages, such as Flowmaster, that are made to perform mathematics of this nature and to be coupled with a graphical user interface. This type of software makes creating physics-based models easy, but usually does not allow for the interaction of different systems.

A hardware-in-the-loop model uses one or more physical devices representing actual devices that will be used in the system of interest. This modeling approach can be highly effective because the simulative hardware is the actual hardware that will be used in the system that is being simulated. There can be any of several levels of hardware-in-the-loop models, such as using an actual valve connected to a pipe with a pump, or simply connecting a valve controller. The purpose of hardware-in-the-loop simulation is usually to test the hardware. In addition, hardware-in-the-loop simulation can be used, in combination with software simulation tools for filling the gaps in-between the hardware devices, for seamlessly analyzing a system.

Models may differ in the degree of detail that they afford. The level of accuracy required of the model may determine what type of model should be used to simulate a given system. The best model will usually be the actual system itself, but that is not always practical. A physics-based model tends to be far more detailed than a rule-based model, but that level of detail may not be required. A physics-based model tends to be slower than a rule-based model. Parameters such as complexity and processing time may also influence a decision of how to model a particular system. Many models of individual systems are already in existence. The present invention provides, inter alia, a new and improved method of sharing information between individual systems.

Reference is now made to FIG. 2 through FIG. 10, which are illustrative of typical practice of the present invention. In order to simulate a system of systems, information must be passed between the existing system models 150. Synonymously used herein are the terms "model/simulation," "model," "simulation," "modeler/simulator," "modeler," "simulator," "modeler/simulator program," "modeler program," "simulator program," and the like. Ease of passing information from one system model/simulation 150 to another is emphasized by the present invention as a major requirement for informing between system models/simulations 150. The present invention places more of a premium on ease of inter-model communication of information than on speed of inter-model communication of information. The present invention affords less complicated and more straightforward wrapping, viewing, debugging, and expanding of models, information, and inter-model informational communication.

Noteworthy is the present invention's capacity to "plug-and-play" various model/simulation program 150 packages that are each designed to model/simulate a particular type of system. The inventive method succeeds in being as flexible and universal as possible, admitting of use of any existing system models/simulations, and allowing for as little or as much information as needed to be passed from one system model/simulation to another. Typical inventive practice affords a plug-and-play environment providing, almost limitlessly, for use of existing modelers/simulators 150 to representing systems, sharing of resources over a network, and smooth and trouble-free addition of new modelers/simulators 150 to represent systems in an ever-expanding system of systems. The present invention's capability of incorporating existing models into an inventive environment can significantly reduce overhead and parallel work functions. Generally speaking, the present invention's ease of use outweighs any of the speed loss due to the "generic" nature of the present invention's environment. The present invention's methodology allows for solutions that can accommodate practically any simulation software.

Featured by the present invention is, inter alia, its "centralized database" (also referred to herein as its "central database") 201, which is the present invention's informational "backbone," where information can be shared by the various system models 150. The present inventors conducted testing of an embodiment the present invention using a generic SQL server (adapted from MySQL, Sun Microsystems) as the central database for storing information that is required to pass from system to system. The ordinarily skilled artisan who reads the instant disclosure will appreciate that various servers can be utilized in practicing the present invention.

The present invention, as typically practiced, entails both a simulation process and a simulation environment. Many inventive embodiments incorporate multiple engineering system modeling/simulative capabilities—such as physics-based software simulation programs, hardware-in-the-loop modeling programs, etc.—so as to dynamically and accurately simulate operation and interaction of a system of systems. Individual systems are inventively interlinked through a common database, and are able to interact with each other at appropriate time steps. The inventive process of simulating a system of systems typically includes identifying interdependencies between individual systems (e.g., fluid system with electrical system, fluid system with communications system, electrical system with communications system, etc.), and spatially orienting each component of each system within a virtual environment (e.g., ship, power grid, building, etc). Dependencies within a system of systems can be automatically optimized, based on criteria including but not limited to system failures, system damage, and/or maintenance scenarios.

A typical embodiment of the present invention's method for dynamically simulating a system of systems comprises: (a) determining individual systems constituting a universal system of the individual systems; (b) associating a simulative computer program 150 with each individual system; (c) establishing a central database 201; and, (d) iteratively performing, in universal time steps: (i) updating of the data tables 202 in the central database 201; and, (ii) displaying of information pertaining to the data tables 202.

Figure 2:
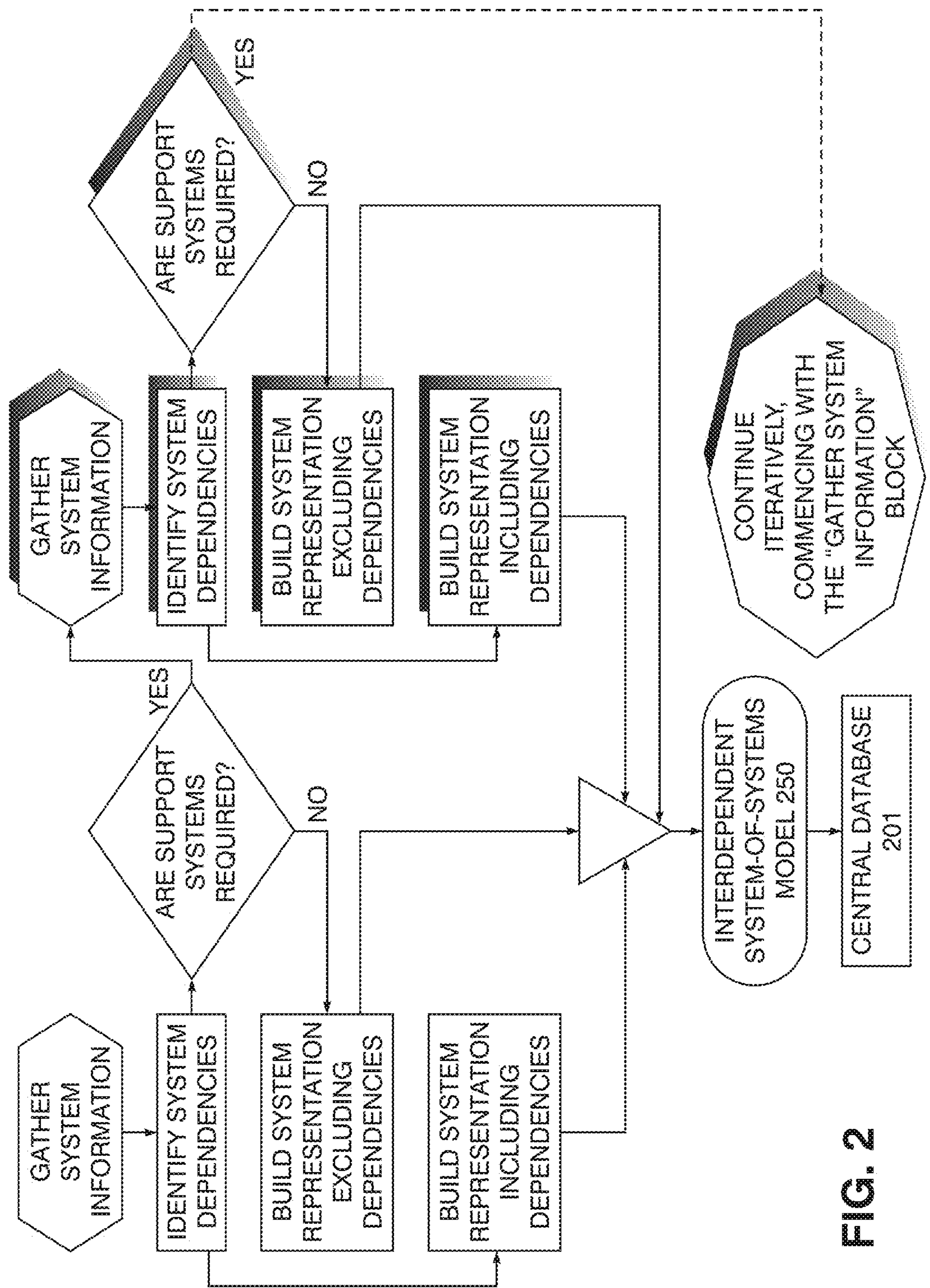
FIG. 2 is a flow diagram of constructing an embodiment of a system-of-systems simulation environment in accordance with the present invention.

As illustrated in FIG. 2, the determining of the individual systems includes identifying dependencies between the individual systems. An individual system may have a dependent relationship with respect to at least one other individual system, or may have no dependent relationship whatsoever with respect to any other individual system; in other words, an individual system may have one or more dependencies, or no dependencies. The establishing of the central database 201 includes constructing data tables 202 indicative of the dependencies between the individual systems. The data tables 202 are contained in the central database 201, and are accessible by each simulative computer program 150.

In his/her effort to build a system-of-systems model in accordance with the present invention, a practitioner of the present invention will typically be required to consider a variety of factors. Examples of factors, and categories of factors, that may come into play in many inventive embodiments are the following: physical layout (e.g., power grid, natural gas lines, control system, auxiliary system); control algorithms (e.g., general con-ops, fault control con-ops, hardware behavior, system reaction when control is not available); potential threats (e.g., terrorists, maintenance issues, fires); system-of-systems considerations (e.g., normal operations, fault operations, hostile operations; existing models.

For instance, in order to inventively develop the modeling environment, the inventive practitioner may need to know the physical layout of the system that he/she is designing. This physical layout will be used by whichever modeling tool best fits. For instance, the inventive practitioner may select Flowmaster for fluid flow models, MatLab for communication models, etc. As another example, according to frequent inventive practice the control algorithms are a vital component of the modeling environment. These algorithms allow for designing of levels of intelligence into the individual systems. For instance, an algorithm for a "smart valve" (e.g., a valve having embedded pressure sensors and capable of actuating based on its own sensor readings) may be an external program that takes in readings from the fluid model (out of the SQL server) and writes valve commands back to the server and, in turn, the valve actuates within the fluid model.

Figure 3:
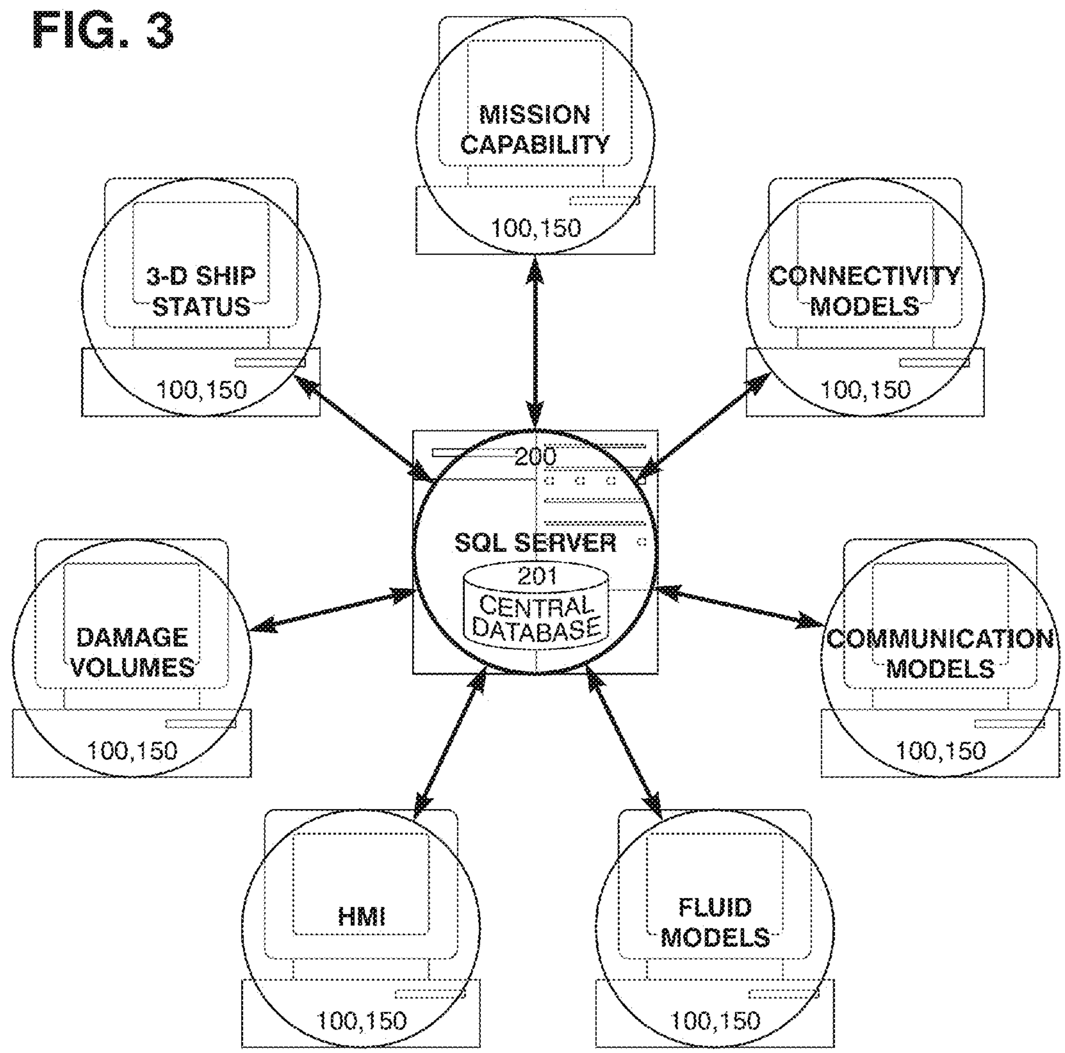
FIG. 3 is a schematic of an embodiment of a computer network in accordance with the present invention.
Figure 4:
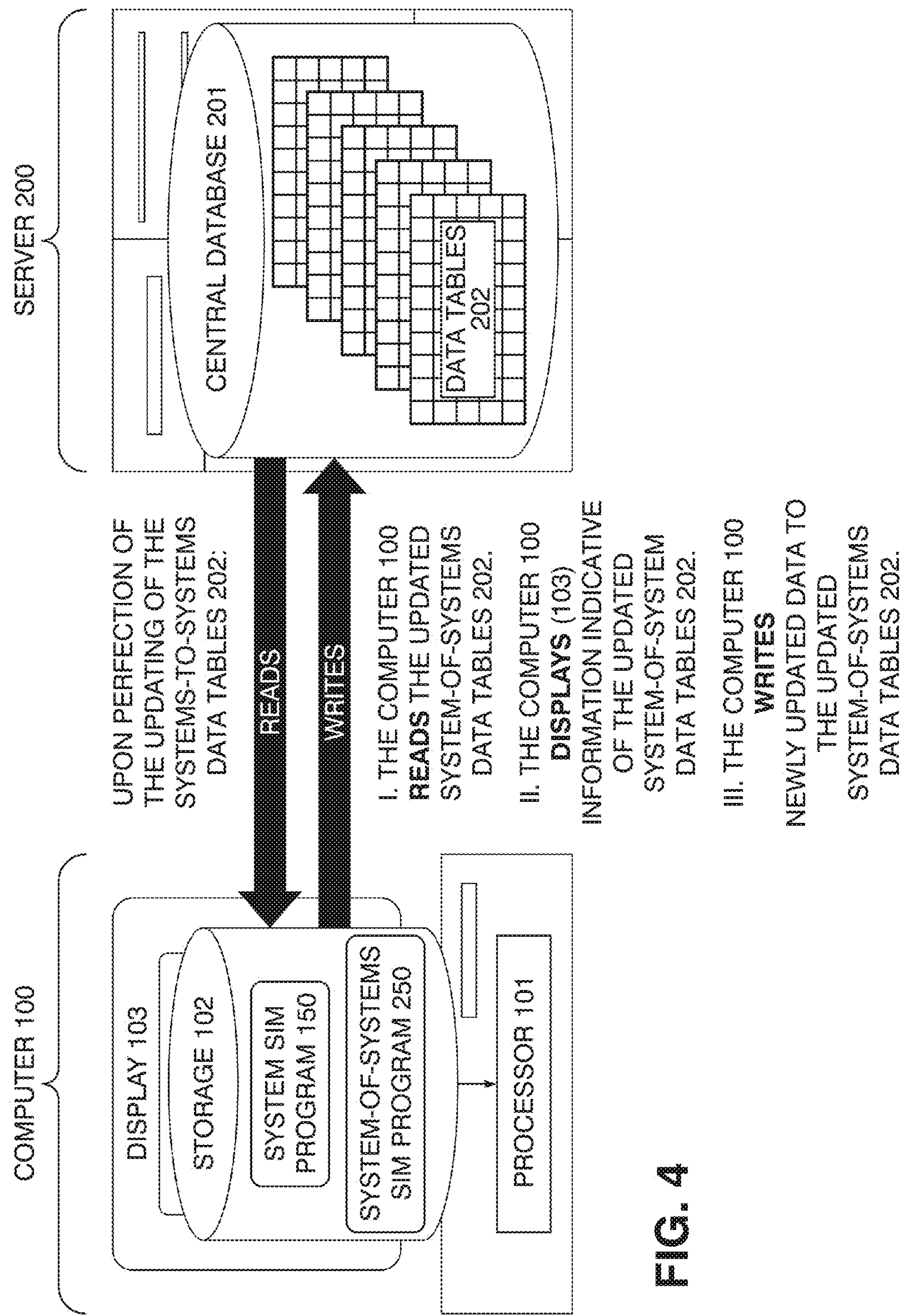
FIG. 4 is a schematic of an embodiment of interactive transmission between computer and server in accordance with the present invention.
Figure 5:
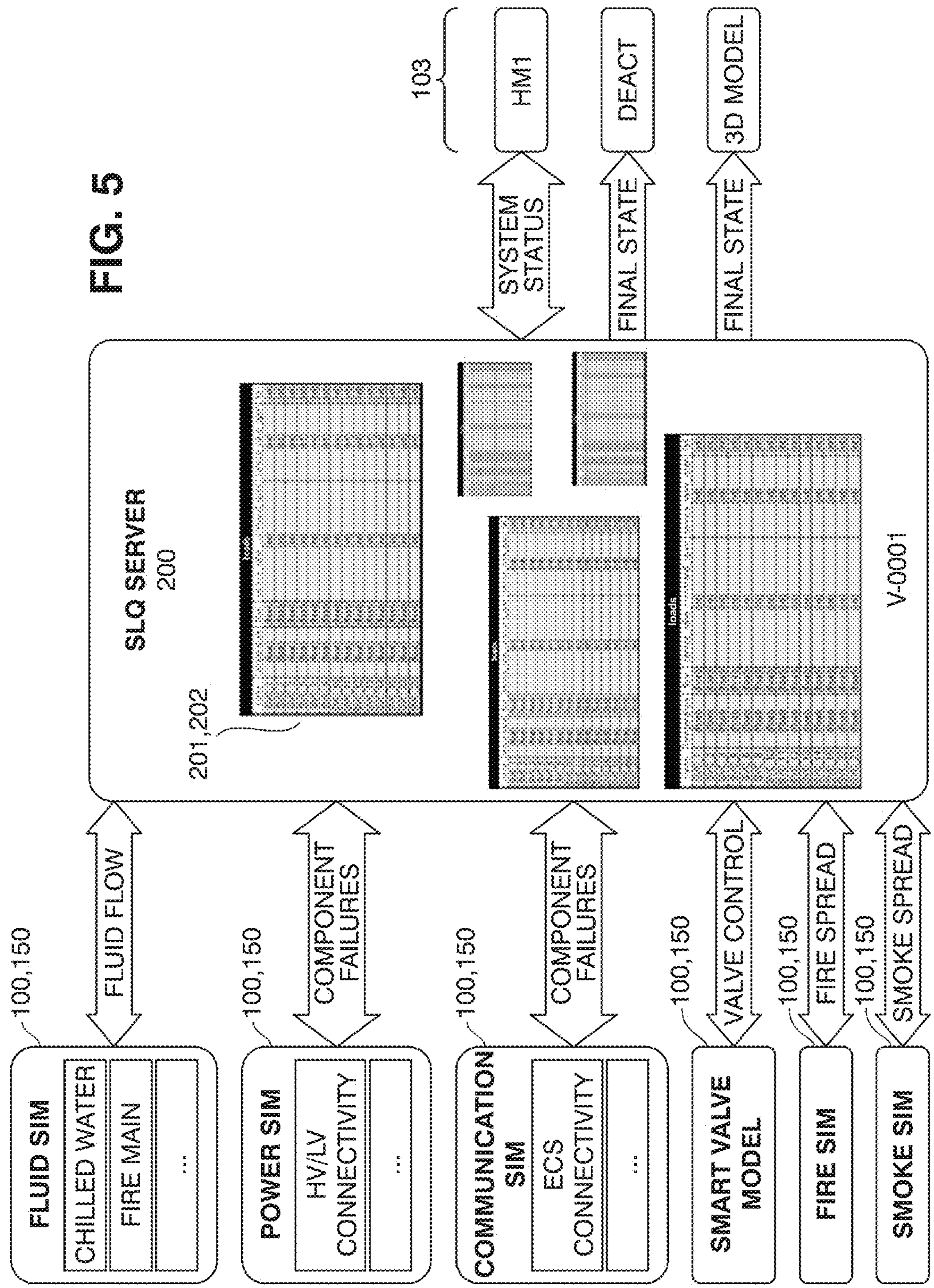
FIG. 5 is a schematic of an embodiment of simulation, in accordance with the present invention, of a universal system of individual systems including a fluid system, a power system, and a communication system.

As illustrated in FIG. 3 through FIG. 5, each individual computer 100 includes a processor 101 and memory/storage 102 (typically, both volatile and non-volatile) for holding and processing data and for running compute software, embodied in computer code. Each computer 100 has resident in its memory/storage 102 a conventional system-simulative computer program. One of the computers 100 has further resident in its memory/storage 102 an embodiment of an iteratively simulative computer program 250 (including time controlling/sequencing programming) in accordance with the present invention.

Each computer 100's system-simulative computer program communicates with the SQL server 200 only. SQL server 200's database 201 is organized in such a fashion that all of the properties of any given device in any system that can affect any other device in any other system are accounted for. In this way, information can be shared between simulators 150 that have similar devices, e.g., pumps, valves, etc. Many software packages allow, out-of-the-box, for exchanging of information with an SQL server. Some software packages do not allow for exchanging information with an SQL server, but "wrappers" can easily be written for older software packages that use COM, OLE, or other methods for sharing system information.

The architectural design shown in FIG. 3 is akin to that of a DOMINO-type environment, in which a server such as SQL server 200 contains a database such as central database 201. A notable advantage of a DOMINO-type environment is that none of the various components is required to communicate directly with any other component; instead, the components can rely upon the server in order to indirectly communicate with one another.

As depicted in FIG. 3, in an inventive network each computer 100 can send its pieces of information to the central database 201 contained by SQL database 200, and any computer 100 that requires those pieces of information can read them from the central database 201 contained by SQL server 200. This communicative approach promotes the present invention's ease of expandability of the modeling environment. According to frequent inventive practice, each type of model has a different communication protocol. Inventive adoption of a DOMINO-type architecture concept allows, for instance, for programming of a fluid model so that it communicates with the SQL database 200 only. There is no need to program plural communication protocols into a model in order to share data between components.

The following commercially available products are examples (and there are many others) of modeling/simulation programs 150 that can be used for representing individual systems and sharing data between one another via an SQL server 200, in accordance with inventive practice of system-of-systems simulation: Vizard (WorldViz); LabView (National Instruments); AutoCad (AutoDesk); Rhinoceros (McNeel North America); Wonderware (Wonderware); Java (Sun Microsystems); Flowmaster (Flowmaster, Inc.); MatLab/Simulink (The MathWorks).

The inventive sharing of information between software packages typically involves organization of each device into an appropriate data table, such as data tables 202 respectively portrayed in FIG. 6 and FIG. 7. Each data table 202 represents a kind of device, and the columns of the data table 202 respectively correspond to the properties of specific devices of that kind. For example, the data table 202 depicted in FIG. 6 is called "Pump," and has columns denoted "command_on," "state_on," "speed," etc. The rows of FIG. 6 respectively correspond to different specific pumps ("pump 1," "pump 2," etc.). In this manner, the "command_on" can be controlled individually for each pump, and the program that is simulating the pumps can use that information to start the pumps and report back to the "speed" column for each pump. The data table 202 depicted in FIG. 7, called "Valves," has similar tabular attributes. If a new system is added to the existing inventive environment, this will not affect the existing simulators; data tables 202 will be added to accommodate the new devices, and properties of existing devices will be added to previous data tables 202 if more information about a specific device is shared.

An individual device (e.g., a valve or pump) within one model/simulator 150 can share one or more of its characteristics (e.g., "vital statistics") with other models/simulators 150. For instance, let us assume that the pump data table 202 portrayed in FIG. 6 and the valves data table 202 portrayed in FIG. 7 each reside in central database 201 of SQL server 200. In addition to the valves data table 202 and the pump data table 202, other data tables 202 (e.g., data tables 202 relating to other model/simulation components 150 in the system of systems) reside within the central database 201 of the SQL server 200. The valves modeler/simulator 150 writes its data to the valves data table 202. The pump model/simulator 150 writes its data to the pump data table 202. Each model/simulation tool 150 moves data back and forth between itself (more specifically, storage 102 of the computer 100 in which the model/simulation tool 150 resides) and the server 200.

FIG. 5 illustrates, by way of example, the sharing of information in an inventive system-of-systems network that includes several client computers 100 and a system-of-systems server (host) 200. If there is a power damage event, for instance, the block labeled "Power Sim" will generate a list of power faults caused by the damage event, and will write that data to the server 200. The computer 100 block labeled "Fluid Sim" will see those power faults and will not allow that valve to operate if it is unpowered. This particular interconnectivity between the power model/simulator 150 and fluid model/simulator 150 is but an example of numerous possibilities of interconnectivities in this example of inventive practice. Each of the computer 100 blocks shown on the lefthand side of FIG. 5 writes its own information to the server 200's database 201, and acts on information received from the server 200's database 201. The display 103 blocks on the righthand side of FIG. 5 represent display tools that pull data from the database 202 and permit the respective operators of computers 150 to watch the individual program 150 simulations as they run.

Figure 8:
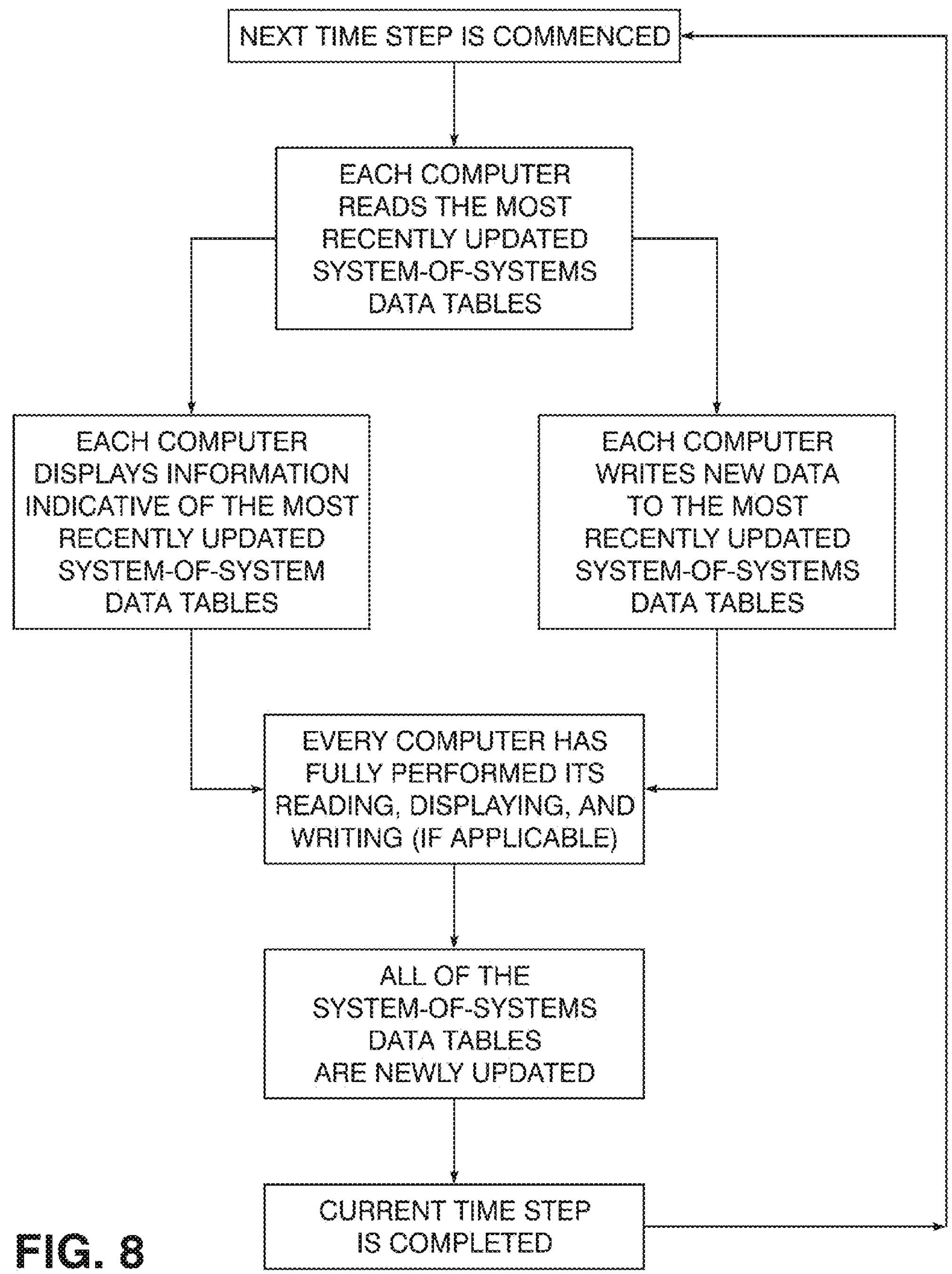
FIG. 8 is a flow diagram of an embodiment of computer-actuated time-interval control in accordance with the present invention.
Figure 9:
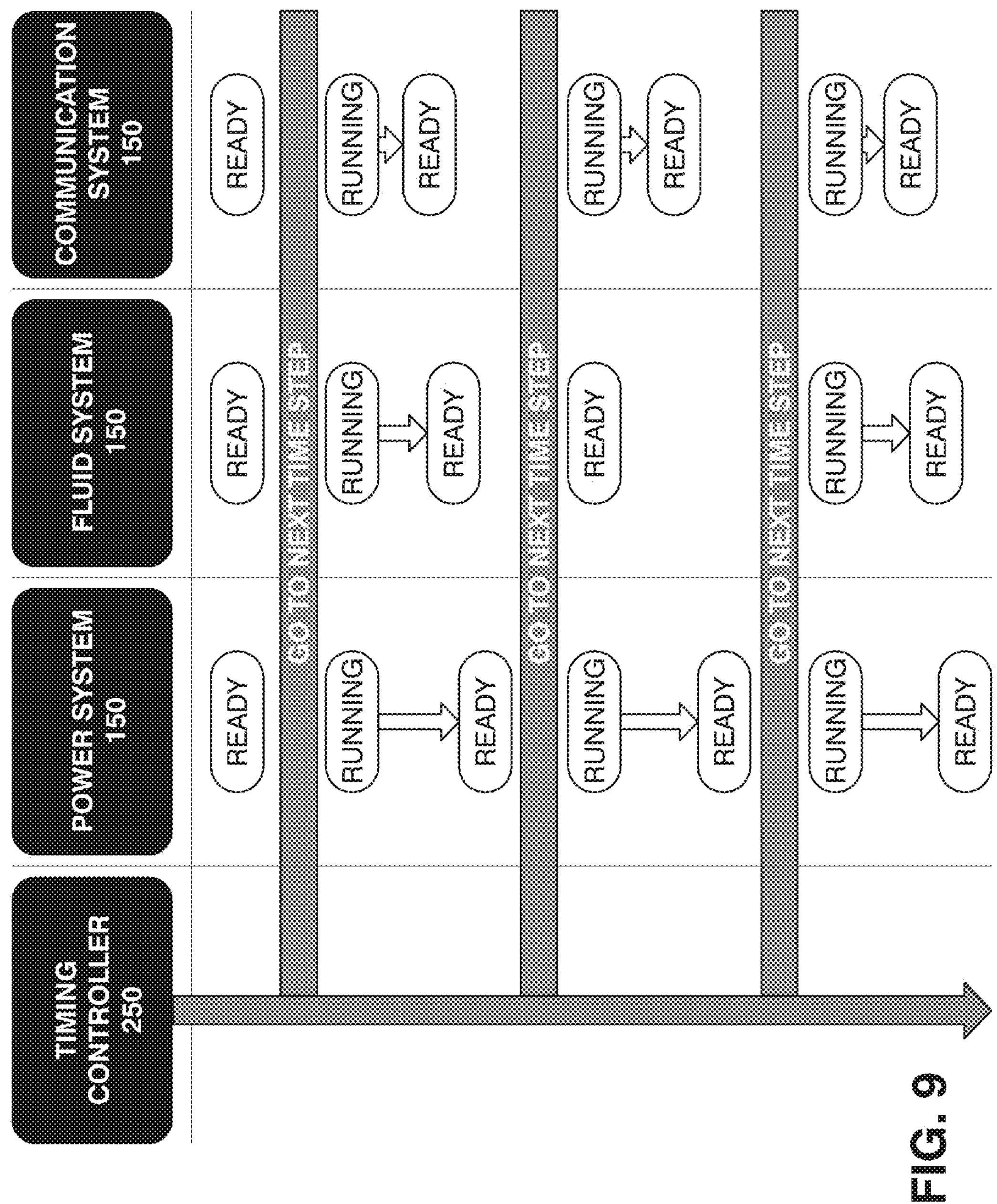
FIG. 9 is an example of temporal coordination of multiple time steps in accordance with the present invention.

At least two "universal time steps" are performed, according to typical practice of inventive system-of-systems simulation. As illustrated in FIG. 8 and FIG. 9, each universal time step is characterized by contemporaneous activity of all of the simulative computer programs 150 whereby every simulative computer program 150 performs, in its own "individual time step": (i) reading of one, some, or all of the data tables 202; and, (ii) writing of new data to one, some, or all of the data tables 202. Each individual time step ends once the corresponding simulative computer program 150 completes its reading and its writing. The universal time step ends once every said individual time step ends.

According to typical inventive practice, not every simulator 150 reads from and writes to every data table 202 in database 201; rather, each simulator 150 reads from and writes to the same corresponding set of data tables 202. Each simulator 150 reads from a set of data tables 202 that is particular to that simulator 150, and writes to the identical set. This set of data tables 202 corresponding to a particular simulator 150 can consist of one data table 202, or some (plural) but not all data tables 202, or all (plural) data tables 202. Typically, each simulator 150 is programmed to "relate to" (read and write to) any data table 202 that is substantively related to it, e.g., that contains at least one data item/entry/subject (such as a device) that bears relation to the simulator 150.

The SQL server 200 holds the information for the current universal time step, and updates at the end of each universal time step. According to typical inventive practice, a time controller program (e.g., a flow wrapper or flow adapter) is used to regulate the time and to ensure that each simulation program 150 is on the appropriate universal time step. In the light of the instant specification, a person of ordinary skill in the art will appreciate how to exercise time control in the context of inventive practice. Typically, the time controller program is resident on one of the individual computers 100, in which is also resident an individual model/simulation program 150. A minimum universal time step duration can be selected by the inventive practitioner, based upon which models are being simulated. All simulators 150 are required to wait at least until the minimum universal time step time duration has passed, and then complete its individual time step within that universal time step.

At the beginning of each universal time step, each individual simulator 150 downloads, from the SQL server 200, the data tables 201 that contain devices in its individual system. In the individual time step that an individual simulator 150 runs within the universal time step, the simulator 150 writes back, to SQL server 200, all changes to the devices, and finally informs SQL server 200 that it (simulator 150) is ready for the next universal time step. When the time controller program determines that all of the simulators 150 are ready for the next universal time step, the time controller program changes the time and commands all of the simulators 150 to continue to their respective next time steps, and the cycle repeats.

As illustrated in FIG. 8 and FIG. 9, all of the system simulators 150 are maintained at equal time steps. Otherwise expressed, in each universal time step, all of the system simulators 150 are forced to wait for the slowest system simulators 150. In each universal time step, each system simulator 150, at its own pace, reads all of the system-of-systems data in the central database 201 and then writes updated (new) data to the central database 201. No universal time step is concluded until every system simulator 150 has completed its own reading and writing of data. If a simulator 150 is characterized by faster individual time steps than other simulators 150, then the faster simulator 150 will wait for the other (slower) simulators 150 to complete their respective individual time steps. Conversely, if a simulator 150 is characterized by slower individual time steps than other simulators 150, then the other (faster) simulators 150 will wait for the slower simulator 150 to complete its individual time steps.

During each universal time step, each system simulator 150 reads, displays, and writes data, as follows. The system simulator 150 reads (assimilates) the pertinent portions of the central database 201's system-of-systems data in its updated form as it existed at the conclusion of the preceding universal time step. Based on the system-of-systems information that the system simulator 150 has read, the system simulator 150 writes (conveys) its own newly updated data to the pertinent portions of the central database 201's system-of-systems data. A universal time step is concluded when every system simulator 150 has completed both its reading and writing of data—i.e., has completed both its reading and its writing—viz., its reading of the pertinent portions of the central database 201's system-of-systems data, and its ensuing writing of updated data to the pertinent portions of central database 201's system-of-systems data.

Regardless of whether, in a given universal time step, a system simulator 150 has changed data (e.g., via additions, and/or deletions, and/or modifications), the system simulator 150 writes anew its corresponding share of data to the data tables 202. That is, in every universal time step, every system simulator 150 imparts its updated information to the data tables 202, regardless of whether the newly updated (current universal time step's) information differs from the previously updated (previous universal time step's) information.

Upon the conclusion of each universal time step, all of the system-of-systems data contained in the central database 201, as updated, is displayed, and a successive universal time step is commenced. Vis-à-vis the previous universal time step, a given universal time step may yield an increased quantity of central database 201 data, a decreased quantity of central database 201 data, or an equal quantity of central database 201 data.

In each universal time step, the displayed information pertains to the data tables 202 as they existed at the end of the previous universal time step. According to typical inventive practice, in each universal time step the information is displayed on at least one computer display 103 by at least one simulative computer program 150, and the displayed information is in the form of a graph, or a schematic, or a three-dimensional drawing. A dependency can be between two or more individual systems. Each of the dependencies can be either a direct dependency or an indirect dependency.

One category of applications, among many, for which inventive system-of-systems model/simulation can be propitiously practiced, is ship applications. Corresponding to each time-step run of the inventive system-of-systems, model/simulation, a set of parameters is generated that define the current ship status (normal, fault, damage, etc.). Each time-step-conclusive ship status will propagate different initial system configurations to the individual model 150 components of the inventive system-of-systems model/simulation.

A hardware-in-the-loop simulator that is capable of running faster than real time will typically be forced to wait for the actual hardware to catch up in real time. According to some inventive embodiments, the simulators can be run in a "batch mode" setting so that, in each iteration, slight differences are rendered to one or more simulators 150, thereby attempting to optimize the models/simulations. The present invention can be embodied to provide that the conclusion of a universal time step is contingent not only on the completion by every system simulator 150 of its reading and writing, but also on the successful display by every system simulator 150 of some form of pertinent information; however, this approach risks holding up the entire inventive iterative process because of a glitch in a particular display capability.

Figure 10:
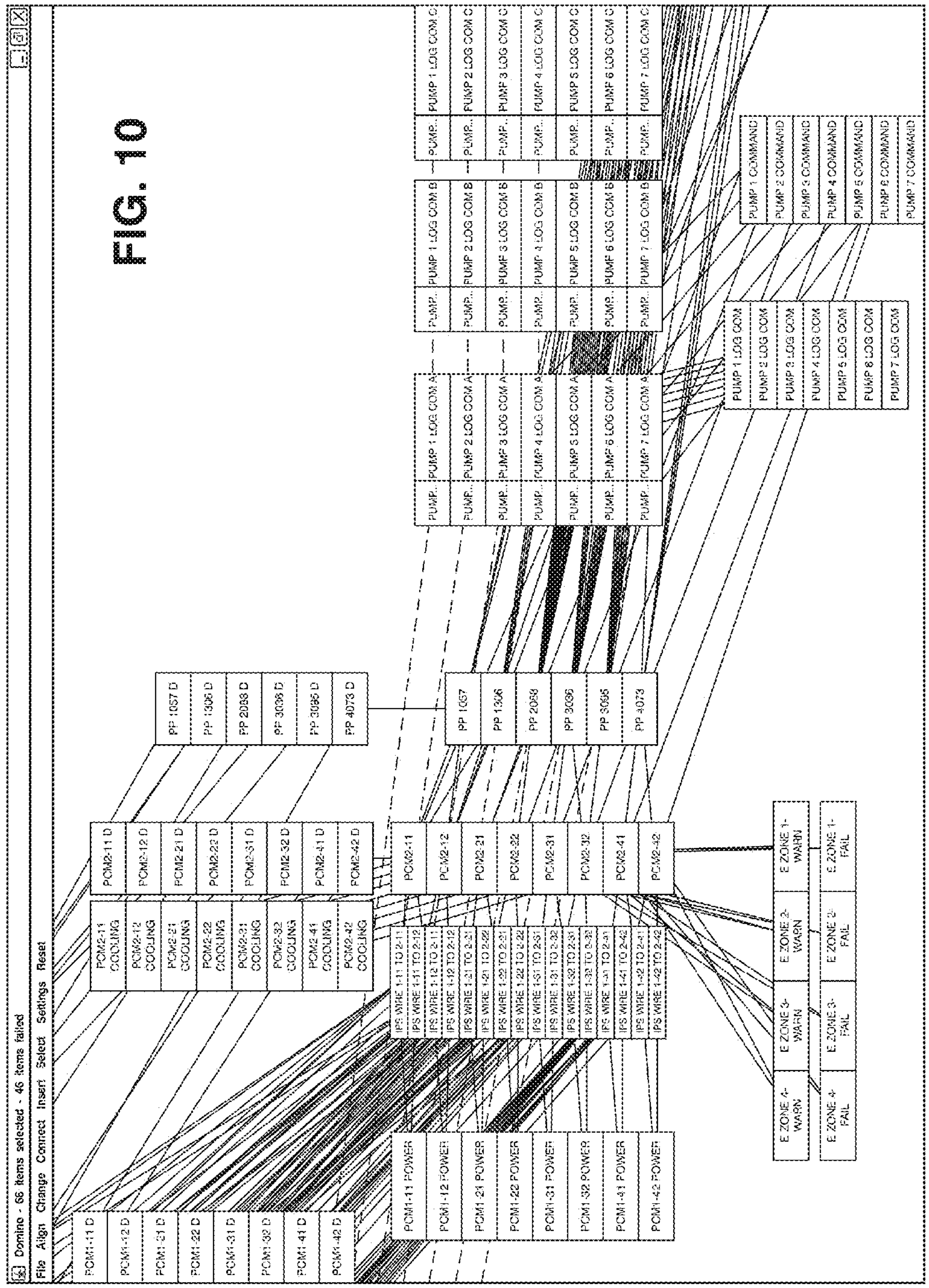
FIG. 10 is an example of a screen shot of a "connectivity model" developed by the U.S. Navy.

FIG. 10 is an example of a "connectivity model" in accordance with the present invention. The inventive connectivity model shown in FIG. 10 is a sample screenshot of a computer program called "Noyd," which was made by the U.S. Navy based on Java. The Noyd program graphically displays the communication, power, and spatial dependencies of ship system components. It may be important in inventive practice to account not only for dependencies between systems, but also for dependencies "in-between" (intermediate) systems. There may be some events that take place in-between two or more individual systems and that are not fully accounted for in a system of individual systems.

For example, a power simulator program 150 may determine that five volts exist across a valve controller. The fluid system may not have a way of responding differently depending on whether the controller has power, and will probably not have the logic to determine if the controller has power based on the amount of volts across it. Assuming that normal operating voltage is five volts, the fluid system may not be able to adjust if, for instance, there are only three volts across the controller due to a brownout, or there are over one hundred volts across the controller due to an electrical surge. Such circumstances are not taken into account in either the fluid model or the power model, as the power model just reports what the voltage is, and the fluid model has no way of knowing how to react. In this example of events that can take place in-between fluid and power systems, a third model (such as provided by the U.S. Navy's Noyd) may be needed to check that the voltage is in an appropriate range and to then determine whether the controller is powered or not. The fluid model can then decide if the valve operates, deciding this based not on the voltage across, but rather on a simple Boolean logical construct indicating whether the controller has power or not.

The above is but an illustration of how it may be preferable in many inventive embodiments to include one or more connectivity models 150 among the various individual models 150 encompassed by the inventive system-of-systems simulation, in a manner such as depicted in FIG. 3. "In-between" problems of this nature can affect many devices in each individual system of a universal system of systems. The U.S. Navy's Noyd, a graphical rule-based dependency program, exemplifies a computer software solution to such problems. As depicted in FIG. 10, boxes representing different properties of devices can be inserted into the Noyd program. Lines can be drawn between boxes to establish simple logical relationships. SQL server 200 information can be applied to each box. If, for instance, a box is determining whether a controller has power, it can check a particular record in the SQL Server 200 to see if it falls in the range of certain value, and then report the Boolean answer to another record in the SQL Table.

Practitioners of the present invention may wish to vet their individual systems based on real-world damage scenarios. Using a damage model, a "hit" can be propagated throughout all of the modeled systems. This kind of approach can verify or amplify computer-modeled connectivities such as shown in FIG. 10. Inventive practice can provide for infliction of structurally specific damage, wherein the effects on each of the systems modeled are then extrapolated and inflicted on each of the specific modeled systems, and the integrated effects and responses are then identified.

The central database 201 of SQL server 200 serves as the "backbone" to the inventive system-of-systems simulation. No logic is stored in SQL server 200, which is used only as a place to store information temporarily for a single universal time step. These inventive attributes allow for a "debugging-friendly" environment, facilitating the finding of bugs and holes in an inventive system-of-systems simulation. Debugging according to typical inventive practice is a simple process of finding whether the writing to the SQL server 200 or the reading from the SQL server 200 is incorrect. If a value displayed on a human-machine interface (HMI) display 103 is not the expected value, locating where the error resides is a simple procedure. First, the inventive practitioner can see what the value is in the SQL server 200. If this value is the expected value, then there is an error associated with the HMI. If the value in the SQL server 200 is not the expected value, then there is an error associated with the simulative program 150 generating the information. Were it not for the present invention's feature of a centralized database 200, hours could be spent searching where small errors reside.

The HMI can also be fully tested before running a simulation program 100 by manually changing the values of the SQL server 200. A simulation program 150 can also be tested by watching the values in the SQL server 200 before the HMI is finished, which can improve the amount of time it takes to create the different models for systems that are being simulated. Another benefit of the present invention's use of a server (e.g., SQL server) 200 as the system-of-systems "backbone" is the present invention's ability to run fewer than all of the system simulators 150 at the same time. For instance, if there is an error with the power model 150, then the fluid model 150 can still be run on the assumption that the fluid model 150 has power to all of its devices all the time, the values to the SQL server 200 being filled in accordingly. In this manner, improvements can be made to the different models 150 without completely halting the inventive system-of-systems simulation process.

Typical inventive practice features "distributed computing." The simulation of a system usually necessitates a computationally intense algorithm. This computational intensity can be very much compounded when trying to run multiple simulators on a single computer, and the amount of time required to run a simulation can be greatly increased. The present invention as typically embodied uses a server 200 (for containing a central database 201) and runs each simulation on a separate machine 100, thereby decreasing the amount of time that each simulative program 150 needs to complete a time step. Also, this allows for hardware-in-the-loop functionality; in particular, the information that is generated from sensors on a physical system can be inserted into the SQL server 200. The commands can also be taken from the SQL server 200 and applied to the controllers to control the hardware. If two physical systems are not in close proximity to each other, they can still be run as if they are in the same room, over a network with information being passed back and forth. A model 150 can start as a connectivity model 150, grow into a physics-based model 150, and finally be built in hardware so as to always be permitted to interact with other models 150 in its actual environment, while never affecting the models 150 that it is interacting with.

As individual systems are added to the present invention's universal system-of-systems simulation, more information is generated. Displaying of the generated information can be very challenging in typical inventive practice because of the quantity of information and the constant changing of information. When running a simulation of an individual system, an "end state" is usually found and the end result is the only information that is important to evaluating the system. In contrast, when inventively simulating a system of systems, information is typically needed to be displayed at each universal time step, as different systems will fail and recover at different points during the inventive system-of-systems simulation.

The displaying of results of inventive system-of-system simulations can require plural/multiple computer screens 103 and different techniques for best displaying each system. Using a server's central database as the backbone, plural/multiple displays can be created to show the same system, or separate systems, or multiple systems depending, on the needs of the designer of a given inventive system-of-systems simulation. The displays can be run on separate computers over a network, as well as at remote locations; hence, analyzers can view simulations from practically anywhere.

FIG. 10 through FIG. 15 are screenshots and graphical representations of an HMI display machine 103. Various display techniques can be used to display information generated by the individual simulation programs. Each software package has advantages and disadvantages in how information is displayed. For instance, for some individual systems, a tabular approach, such as a screen with a log in text form, is the best way to display the information. For some individual systems, a full 3D model that changes color, size, and visible field may be best. An individual system may require more than one technique for displaying information, in order to fully describe the current state of the individual system at any given time step. Showing more than one individual system on one screen may also be propitious in order to determine how one individual system influences another and where one or the other can be changed to improve both. When inventive practice provides, at the conclusion of a universal time step, for simultaneous availability of all of the information for all of the individual systems, the art of appropriately displaying the information becomes far more challenging.

Figure 11:
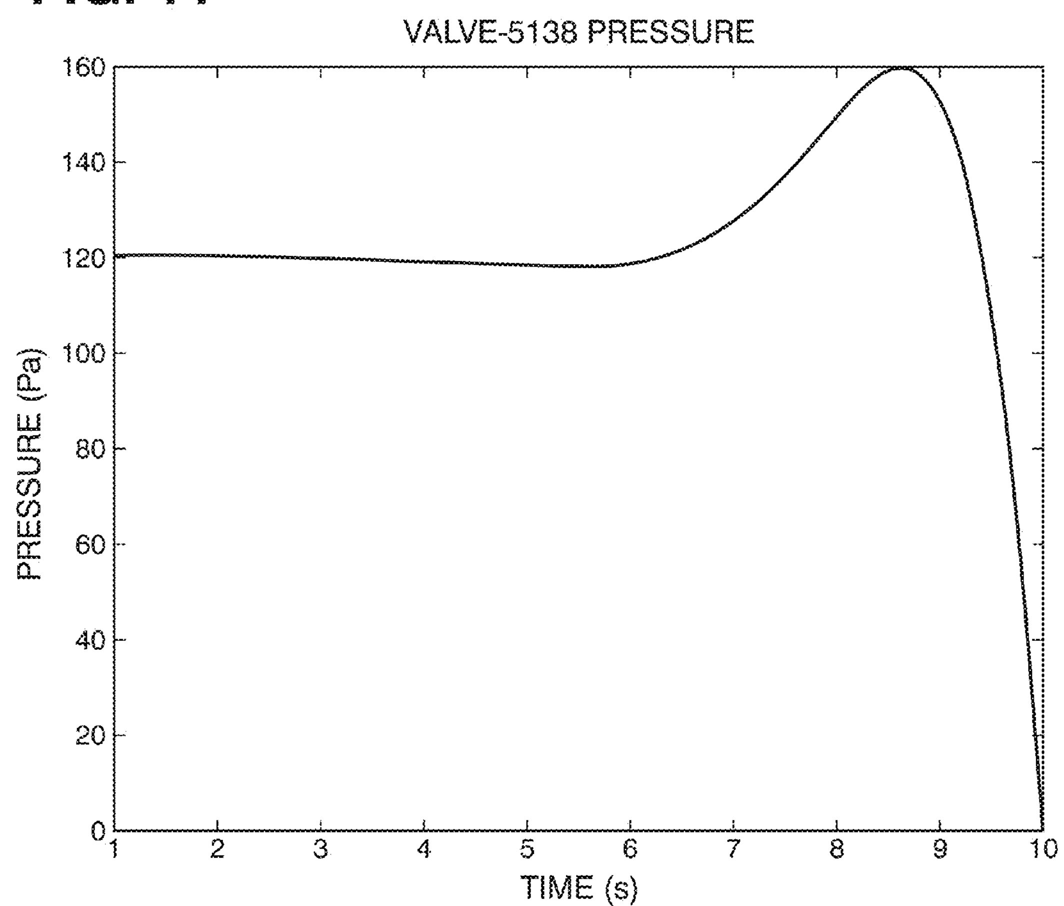
FIG. 11 is an example of a graph illustrating fluid system data.

Traditionally, when simulating one system, graphs (e.g., plots) such as the graph shown in FIG. 11 are used to display sensor information at various parts of the system. In this way, for instance, the pressure through a particular pipe can be viewed over time and compared to the pipes in the vicinity to make sure that the pressure is as expected. If there are irregularities, changes can be made to the system to correct for this until the system meets its requirements. One or more graphic displays can be used in inventive practice in association with the centralized database 201. A program can easily be written in any of various languages, such as Matlab, that access the server 200 and at each time step add another point to a graph that is the value in a particular data table (e.g., record) 202 in the central database 201 of server 200. A graphic technique of displaying the information generated by the individual simulations may be difficult to view and may require abundant screen space, which may be limited as the number of systems simulated is increased.

Figure 12:
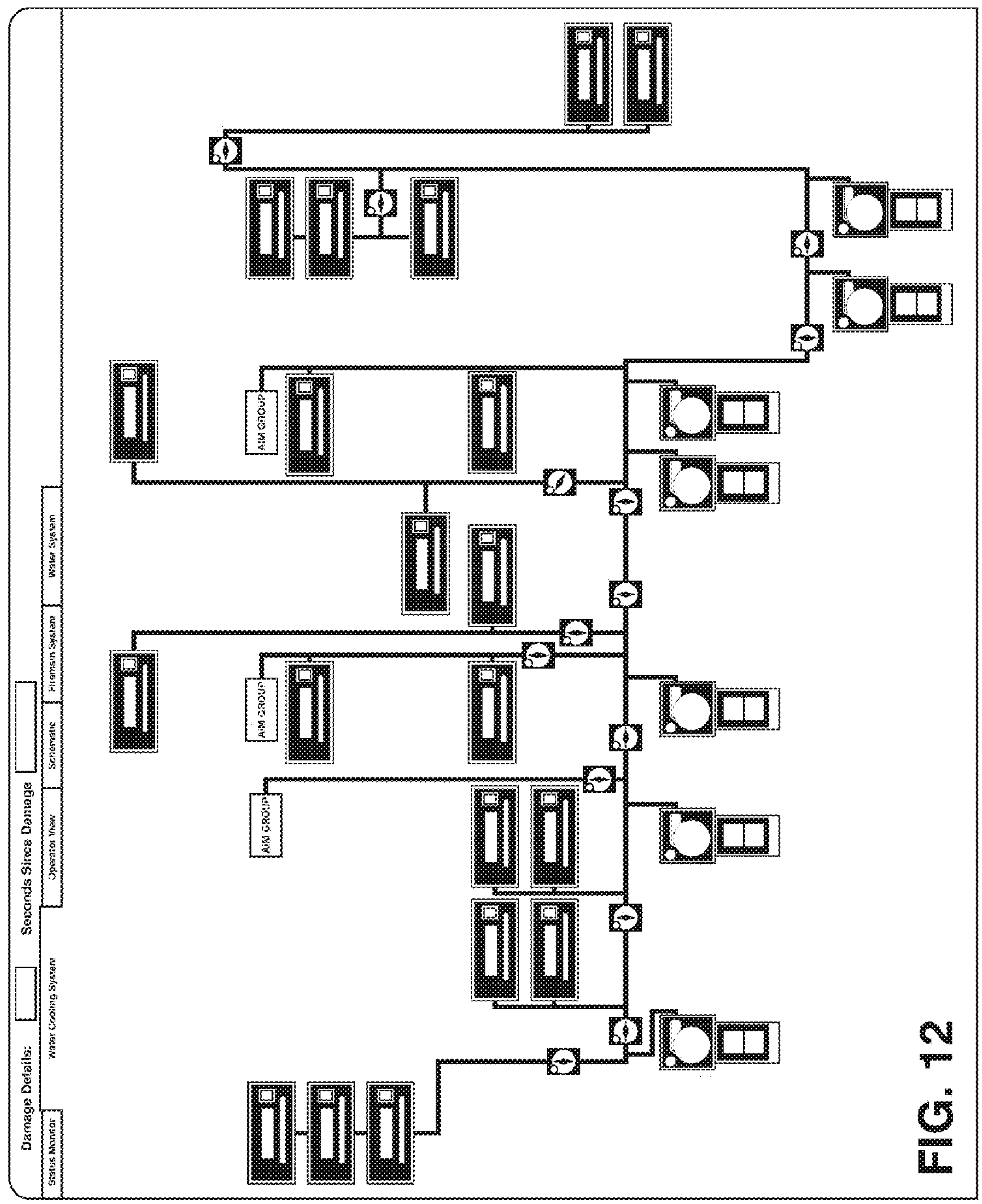
FIG. 12 is an example of a schematic illustrating fluid system data and power system data.
Figure 14:
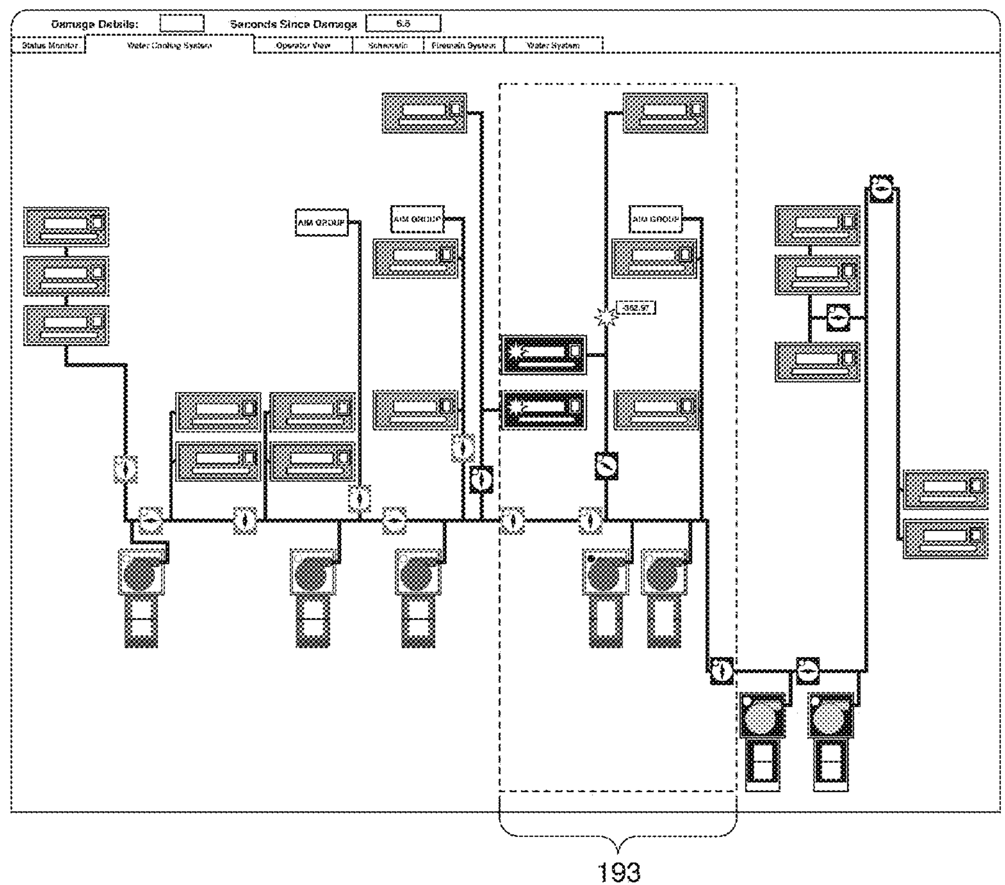
FIG. 14 and FIG. 15 are the schematic of FIG. 11 and the three-dimensional drawing of FIG. 13, respectively, with corresponding areas highlighted in both figures.

Schematics can also be used to display information in graphical form, such as shown in FIG. 12 and FIG. 14. A 2D layout of a given system, with icons to represent devices in the system, can be an effective way to display a large quantity of information. Generally, text in a schematic is easily displayed and read, which is helpful for displaying values of device properties. Combining two systems into one schematic is also an option for showing more specific interaction between the systems. This may become increasingly useful as more individual systems are added to the inventive system-of-systems simulation, as it may be difficult to find the source of unexpected behavior without seeing both the individual system that caused an event and the individual system that is affected by the event. All of the information in the SQL server may be available to the schematic.

Screens can also be created that purposefully hide certain information, to show what a user of the system would see at a viewing terminal. In a physics-based simulation there is usually more sensor information available than in the actual system, because the physics is simulated; since at least some of the calculated physics is not data gathered by sensors, hiding calculated physics can create a display representing an actual screen seen by a system operator. Many software packages, e.g., Labview and Wonderware, are commercially available to create dynamic schematics.

Figure 13:
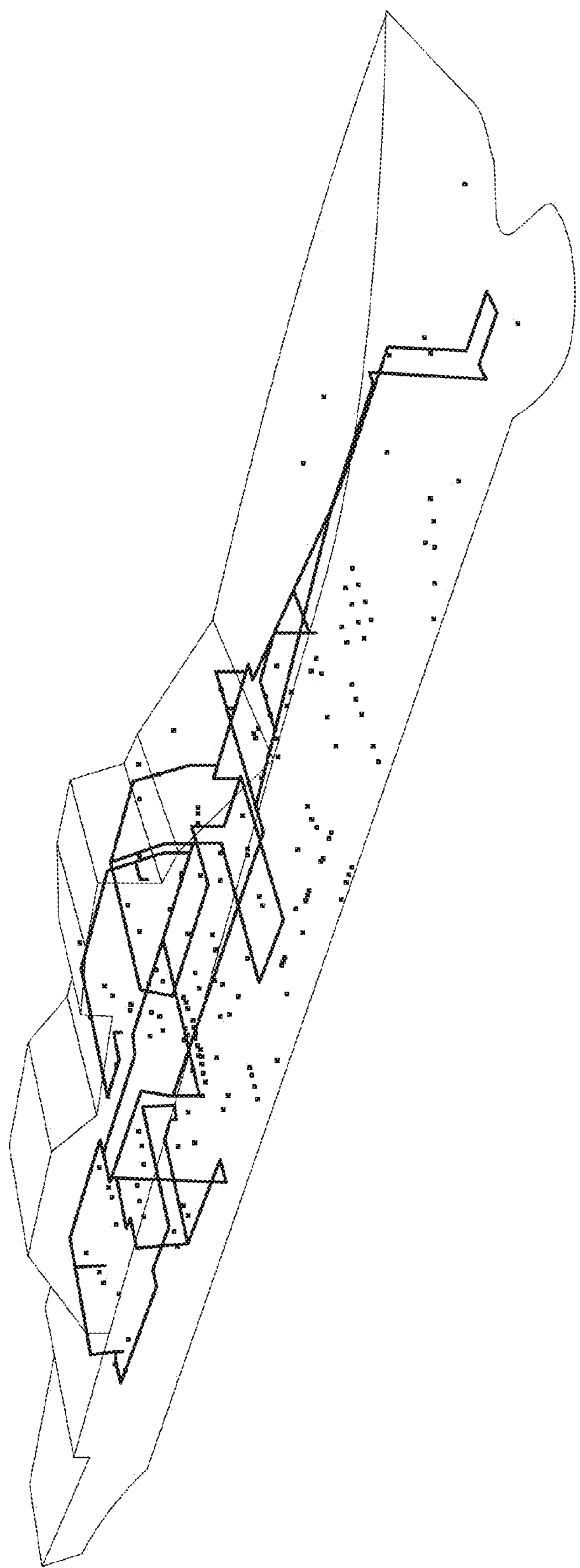
FIG. 13 is a three-dimensional drawing illustrating a communication system onboard a ship.
Figure 15:
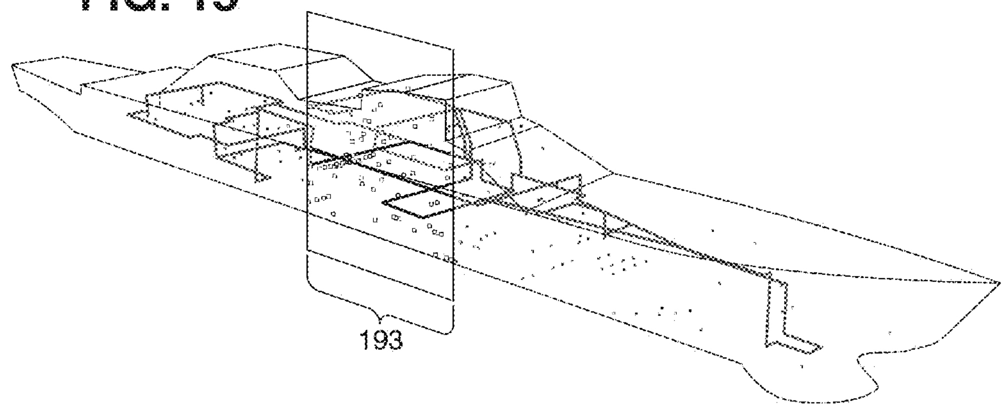

Three-dimensional (3D) drawing of a system, such as shown in FIG. 13 and FIG. 15, is another useful technique for displaying information. Commercially available software packages for creating 3D drawings include Rhinoceros and AutoDesk and many others. A 3D drawing is especially effective in showing physical proximities of different devices. In addition, a 3D drawing can be made to bear resemblance to an actual system of systems. Vizard is among the commercially available 3D programs that allow for an interactive environment. A 3D program with suitable functionality of user input can be used to run a simulation so as to have actual people traveling through spaces and areas where events are taking place; this sort of display can be useful for training or for evaluating a manned response to an event.

A 3D display can be useful as a physical representation of a system, but frequent drawbacks of a 3D display are its potential difficulty in displaying large quantities of information or in displaying text. For instance, if a camera view is changed or an object is far away from the viewer, then any text displayed next to that object may not be visible to the user. Furthermore, as more devices are introduced to a system, the screen containing the 3D drawing can become cluttered and difficult to comprehend, e.g., due to obscured details. When displaying more than one system, it may be difficult differentiate between systems.

The inventive use of a server's central database as the "backbone" for an inventive system-of-systems simulation allows for plural/multiple displays on plural/multiple computers. The individual displays will not slow down the inventive system-of-systems simulation, and individual displays can be created as needed and viewed without changing individual system models. It may be helpful to have two different displays located near each other and jointly visible. For example, it may be effective to show an individual system in a schematic view and a 3D view, such as the schematic shown in FIG. 14 and the 3D drawing shown in FIG. 15. The communication system is seen in both the schematic display of FIG. 14 (which shows fluid and power systems) and the 3D display of FIG. 15. It may be especially useful to conceptually connect the two proximate displays to each other, for instance as by concurrently highlighting the same specific field in both displays, such as illustrated by highlighted field 193 in FIG. 14 and FIG. 15.

It may thus be effective to have the numeric information about a system on one screen, and the physical location of the system's devices on the screen next to it. The boxes in FIG. 15 are hubs and switches, which are able to communicate after an event. Two hubs with the same color are able to communicate, while hubs of different colors are no longer connected. In FIG. 14, the background boxes of each device in the schematic show which devices can communicate with each other. Drawing each device in the 3D display would make the 3D display unusable, but viewing the physical location of the hubs and switches in the schematic allows for changes to be made to eliminate single points of failure. It might be unimportant that a valve in the bow of the ship can communicate with a valve in the stern of the ship, so moving a particular hub or switch allows for local valves to have more redundant paths of communication. Analyzing both screens side-by-side can serve to improve both the communication system shown and the fluid system shown.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. A method for dynamically simulating a system of systems onboard a nautical ship, the method comprising:

creating a universal system simulation in the virtual environment of a nautical ship, said universal system simulation including at least two individual system simulations that are representative of various systems of said nautical ship and that are selected from the group consisting of communication system simulation, fluid system simulation, and power system simulation, said creating of said universal system simulation including determining said individual system simulations that said universal system simulation includes, said determining of said individual system simulations including identifying dependencies between said individual system simulations;

associating a simulative computer program with each said individual system;

establishing a central database, said establishing of said central database including constructing data tables indicative of said universal system simulation, said individual system simulations, and said dependencies between said individual system simulations, said data tables being contained in said central database and being accessible by each said simulative computer program; and iteratively performing updating and displaying in universal time steps, at least two said universal time steps being performed, said updating being updating of said data tables in said central database, said displaying being displaying of information indicative of said data tables, each said universal time step being characterized by contemporaneous activity of all said simulative computer programs whereby every said simulative computer program performs reading and writing in its own individual time step, said reading being reading of at least one said data table, said writing being writing of new data to at least one said data table, said new data completely replacing old data, said old data having been written by said simulative computer program in the previous said universal time step, said old data thereby in effect being completely erased for complete writing anew of said new data, each said individual time step ending once the corresponding said simulative computer program completes its said reading and its said writing, said universal time step ending once every said individual time step ends, wherein in each said universal time step:

said information is displayed in at least two different representations including at least one two-dimensional schematic representation and at least one three-dimensional pictorial representation, each said representation encompassing the same said individual system simulations and indicating plural devices contained in each of said individual system simulations, said devices contained in said communication system simulation being communication system devices, said devices contained in said fluid system simulation being fluid system devices, said devices contained in said power system being power system devices, wherein:

if said universal system simulation includes said communications system simulation and said fluid system simulation, then said two-dimensional schematic representation is informative regarding nautical shipboard functional relationships among said communications system devices and said fluid system devices, and said three-dimensional pictorial representation is informative regarding nautical shipboard relationships in three dimensions among said communications system devices and said fluid system devices;

if said universal system simulation includes said communications system simulation and said power system simulation, then said two-dimensional schematic representation is informative regarding nautical shipboard functional relationships among said communications system devices and said power system devices, and said three-dimensional pictorial representation is informative regarding nautical shipboard relationships in three dimensions among said communications system devices and said power system devices;

if said universal system simulation includes said fluid system simulation and said power system simulation, then said two-dimensional schematic representation is informative regarding nautical shipboard functional relationships among said fluid system devices and said power system devices, and said three-dimensional pictorial representation is informative regarding nautical shipboard relationships in three dimensions among said fluid system devices and said power system devices;

if said universal system simulation includes said communications system simulation, said fluid system simulation, and said power system simulation, then said two-dimensional schematic representation is informative regarding nautical shipboard functional relationships among said communications system devices, said fluid system devices, and said power system devices, and said three-dimensional pictorial representation is informative regarding nautical shipboard relationships in three dimensions among said communications system devices, said fluid system devices, and said power system devices;

the displayed said information is indicative of said data tables as existing at the end of the previous said universal time step;

the entire set of said new data that is written to said data tables by all said simulative computer programs completely replaces the entire set of said old data that is written to said data tables by all said simulative computer programs, the entire set of said old data thereby in effect being completely erased for complete writing anew of the entire set of new data.

2. The method of claim 1, wherein in each said universal time step said information is displayed by at least one said simulative computer program.

3. The method of claim 1, wherein:

each of said dependencies between said individual system simulations is either a direct said dependency or an indirect said dependency;

a direct said dependency exists between said individual system simulations when an event occurring in at least a first said individual system simulation has a causal connection to an event occurring in at least a second said individual system simulation;

an indirect said dependency exists between said individual system simulations when an event occurring in-between at least two said individual system simulations has a causal connection to an event occurring in at least one of the at least two said individual system simulations.

4. The method of claim 3, wherein in each said universal time step said information is displayed by at least one said simulative computer program.

5. The method of claim 1, wherein said information is displayed in at least one said two-dimensional schematic representation and at least one said three-dimensional pictorial representation so that the same field of said universal system simulation is highlighted in each said representation.

6. The method of claim 5, wherein said highlighting serves to facilitate comparison of at least one said highlighted two-dimensional schematic representation and at least one said highlighted three-dimensional pictorial representation.

7. An apparatus for dynamically simulating a system of systems onboard a nautical ship, the apparatus comprising plural computers and a central database, each said computer being configured to simulate an individual system and to access said central database, said individual system simulations being included in a universal system simulation of said individual system simulations in a virtual nautical shipboard environment and being characterized by dependencies between said individual system simulations, said universal system simulation including at least two said individual system simulations that are representative of various systems of said nautical ship and that are selected from the group consisting of communication system simulation, fluid system simulation, and power system simulation, said central database including plural data tables indicative of said universal system simulation, said individual system simulations, and said dependencies between said individual system simulations, said computers performing iterations in separate time steps, each said iteration including updating of said data tables and displaying of information, wherein in each said time step:

every said computer performs an individual read-write run of individual duration whereby said computer reads at least one said data table and writes new data to at least one said data table;

said new data written by each said computer completely replaces old data, said old data having been written by said computer in the previous said universal time step, said old data thereby in effect being completely erased for complete writing anew of said new data;

the aggregate said new data written by all of said computers completely replaces the aggregate said old data written by all of said computers, the aggregate said old data thereby in effect being completely erased for complete writing anew of the aggregate said new data;

said updating of said data tables is perfected, and concomitantly said time step is concluded, upon the completion by all said computers of their respective individual read-write runs;

each said computer displays information corresponding to said updated data tables as perfected at the conclusion of the previous said time step, at least one said computer displaying said information in a two-dimensional schematic representation, at least one said computer displaying said information in a three-dimensional pictorial representation, each said representation encompassing the same said individual system simulations and indicating plural devices contained in each of said individual system simulations, said devices contained in said communication system simulation being communication system devices, said devices contained in said fluid system simulation being fluid system devices, said devices contained in said power system being power system devices, wherein:

if said universal system simulation includes said communications system simulation and said fluid system simulation, then said two-dimensional schematic representation is informative regarding nautical shipboard functional relationships among said communications system devices and said fluid system devices, and said three-dimensional pictorial representation is informative regarding nautical shipboard relationships in three dimensions among said communications system devices and said fluid system devices;

if said universal system simulation includes said communications system simulation and said power system simulation, then said two-dimensional schematic representation is informative regarding nautical shipboard functional relationships among said communications system devices and said power system devices, and said three-dimensional pictorial representation is informative regarding nautical shipboard relationships in three dimensions among said communications system devices and said power system devices;

if said universal system simulation includes said fluid system simulation and said power system simulation, then said two-dimensional schematic representation is informative regarding nautical shipboard functional relationships among said fluid system devices and said power system devices, and said three-dimensional pictorial representation is informative regarding nautical shipboard relationships in three dimensions among said fluid system devices and said power system devices;

if said universal system simulation includes said communications system simulation, said fluid system simulation, and said power system simulation, then said two-dimensional schematic representation is informative regarding nautical shipboard functional relationships among said communications system devices, said fluid system devices, and said power system devices, and said three-dimensional pictorial representation is informative regarding nautical shipboard relationships in three dimensions among said communications system devices, said fluid system devices, and said power system devices.

8. The apparatus of claim 7, wherein said displaying of information includes at least one display by at least one said computer.

9. The apparatus of claim 7, wherein:

each of said dependencies between said individual system simulations is either a direct said dependency or an indirect said dependency;

a direct said dependency exists between said individual system simulations when an event occurring in at least a first said individual system simulation has a causal connection to an event occurring in at least a second said individual system simulation;

an indirect said dependency exists between said individual system simulations when an event occurring in-between at least two said individual system simulations has a causal connection to an event occurring in at least one of the at least two said individual system simulations.

10. The apparatus of claim 9, wherein said displaying of information includes at least one display by at least one said computer.

11. The apparatus of claim 7, wherein said information is displayed in at least one said two-dimensional schematic representation and at least one said three-dimensional pictorial representation so that the same field of said universal system simulation is highlighted in each said representation.

12. The apparatus of claim 11, wherein said highlighting serves to facilitate comparison of at least one said highlighted two-dimensional schematic representation and at least one said highlighted three-dimensional pictorial representation.

13. A computer program product for dynamically simulating a system of systems onboard a nautical ship, the computer program product comprising a nontransitory computer-readable storage medium having computer-readable program code portions stored therein for execution by each of a plurality of computers, the computer-readable program code portions including:

a first executable portion for establishing a central database for said computers, said central database including data tables indicative of, in the context of a virtual nautical shipboard environment, a universal system simulation, individual system simulations, and dependencies between said individual system simulations, said universal system simulation including at least two said individual system simulations that are representative of various systems of said nautical ship and that are selected from the group consisting of communication system simulation, fluid system simulation, and power system simulation;

a second executable portion for updating said data tables repeatedly in universal time steps, wherein in each said universal time step said updating of said data tables includes enabling each said computer to read at least one said data table and write to at least one said data table, each said universal time step encompassing individual time steps respectively characterizing said computers whereby each said computer performs its own said reading and its own said writing in its own said individual time step, each said individual time step being characterized by complete replacement of said data written by said computer in the previous said individual time step and by complete writing anew of said data written by said computer in the current said individual time step, each said universal time step being characterized by complete replacement of all said data respectively written by all said computers in the previous said universal time step and by complete writing anew of all said data respectively written by all said computers in the current said universal time step, each said universal time step being completed when every said computer completes its own individual time step, the completion of a said universal time step signifying the completion of the corresponding said updating of said data tables; and a third executable portion for displaying information in each said universal time step, wherein in each said universal time step the displayed said information pertains to said data tables as completed in the previous said universal time step, said information being selectively displayable as either a two-dimensional schematic representation, or a three-dimensional pictorial representation, or both said two-dimensional schematic representation and said three dimensional pictorial representation, each said representation encompassing the same said individual system simulations and indicating plural devices contained in each of said individual system simulations, said devices contained in said communication system simulation being communication system devices, said devices contained in said fluid system simulation being fluid system devices, said devices contained in said power system being power system devices, wherein:

if said universal system simulation includes said communications system simulation and said fluid system simulation, then said two-dimensional schematic representation is informative regarding nautical shipboard functional relationships among said communications system devices and said fluid system devices, and said three-dimensional pictorial representation is informative regarding nautical shipboard relationships in three dimensions among said communications system devices and said fluid system devices;

if said universal system simulation includes said communications system simulation and said power system simulation, then said two-dimensional schematic representation is informative regarding nautical shipboard functional relationships among said communications system devices and said power system devices, and said three-dimensional pictorial representation is informative regarding nautical shipboard relationships in three dimensions among said communications system devices and said power system devices;

if said universal system simulation includes said fluid system simulation and said power system simulation, then said two-dimensional schematic representation is informative regarding nautical shipboard functional relationships among said fluid system devices and said power system devices, and said three-dimensional pictorial representation is informative regarding nautical shipboard relationships in three dimensions among said fluid system devices and said power system devices;

if said universal system simulation includes said communications system simulation, said fluid system simulation, and said power system simulation, then said two-dimensional schematic representation is informative regarding nautical shipboard functional relationships among said communications system devices, said fluid system devices, and said power system devices, and said three-dimensional pictorial representation is informative regarding nautical shipboard relationships in three dimensions among said communications system devices, said fluid system devices, and said power system devices.

14. The computer program product of claim 13, wherein:

each of said dependencies between said individual system simulations is either a direct said dependency or an indirect said dependency;

a direct said dependency exists between said individual system simulations when an event occurring in at least a first said individual system simulation has a causal connection to an event occurring in at least a second said individual system simulation;

an indirect said dependency exists between said individual system simulations when an event occurring in-between at least two said individual system simulations has a causal connection to an event occurring in at least one of the at least two said individual system simulations.

15. The computer program product of claim 13, wherein said information is displayable in both said two-dimensional schematic representation and said three-dimensional pictorial representation so that the same field of said universal system simulation is highlighted in each said representation.

16. The computer program product of claim 15, wherein said highlighting serves to facilitate comparison of the highlighted said two-dimensional schematic representation and the highlighted said three-dimensional pictorial representation.

* * * * *